Figure 1:
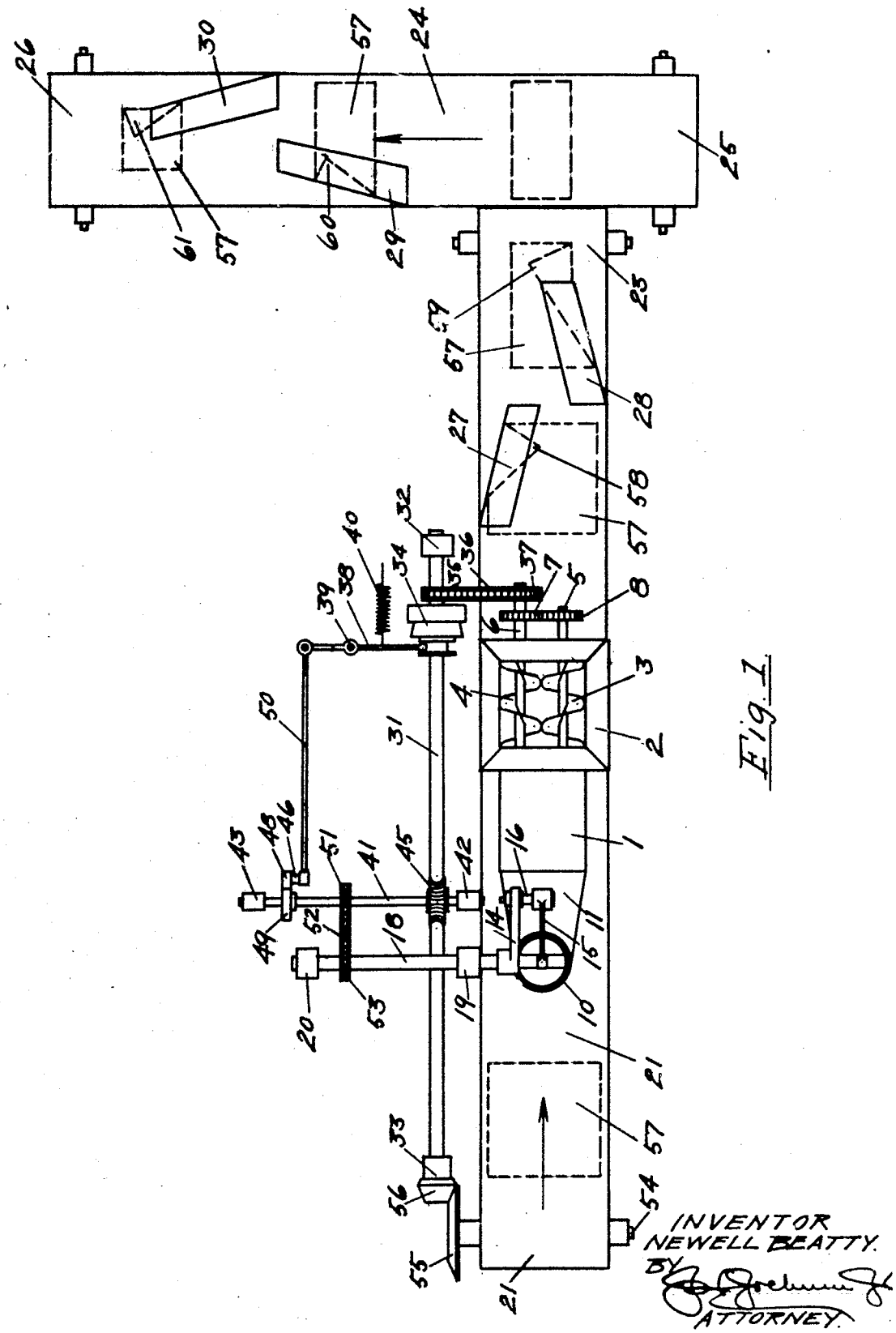

Dec. 8, 1931.  N. BEATTY  1,834,997
MACHINE FOR FORMING AND WRAPPING PLASTIC MATERIALS
Filed Aug. 24, 1929  2 Sheets-Sheet 1

INVENTOR
NEWELL BEATTY.
BY
ATTORNEY.

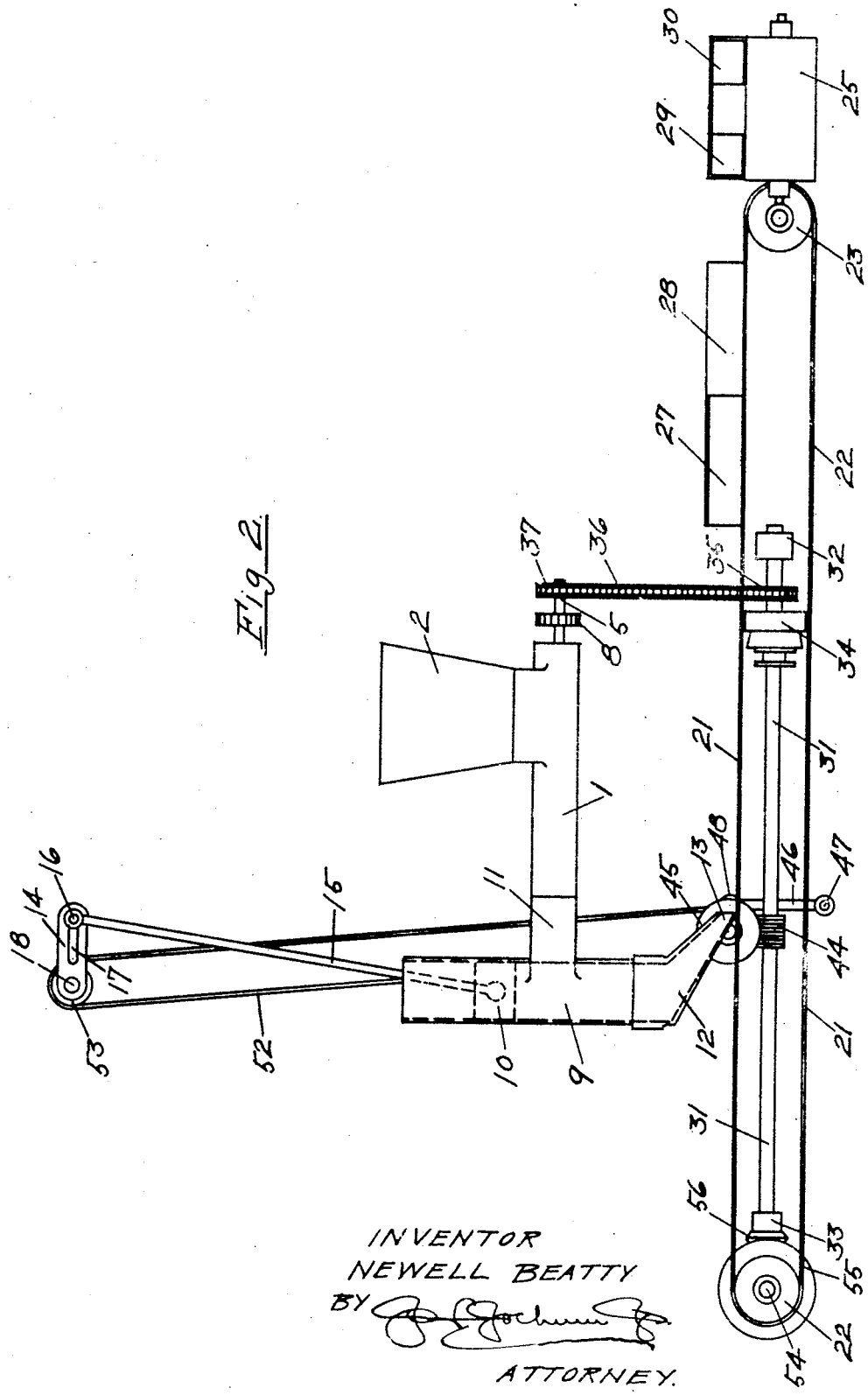

Patented Dec. 8, 1931

1,834,997

UNITED STATES PATENT OFFICE

NEWELL BEATTY, OF HINSDALE, ILLINOIS, ASSIGNOR TO DURKEE FAMOUS FOODS, INC., OF CHICAGO, ILLINOIS, A CORPORATION OF ILLINOIS

MACHINE FOR FORMING AND WRAPPING PLASTIC MATERIALS

Application filed August 24, 1929. Serial No. 388,110.

This invention relates to improvements in machines whereby plastic materials may be automatically formed into any desired shape and then wrapped in a suitable flexible medium such as fabrics made of hair, vegetable fibers, metal cloth, etc.

The machine may be used to form plastic materials such as solidified oils, stearic acid and crushed vegetable seeds, into suitable cakes and wrapping them in a suitable envelope to be subsequently subjected to a pressing operation such as is carried out in the manufacture of cocoanut oil of high melting point, the manufacture of stearic acid or the recovery of oil from oil seeds.

It is to be understood, however, that this machine is well adapted for other uses, such as for forming butter, lard, etc., into suitable cakes and wrapping them in flexible envelopes such as paper or the like.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a diagrammatic top plan view of a machine of this character constructed in accordance with the principles of this invention.

Figure 2 is a diagrammatic side elevation of Figure 1.

Referring more particularly to the drawings the numeral 1 designates a casing of any desired or suitable material provided with a hopper 2. Revolving in the casing 1 are a right hand and a left hand screw 3—4 carried by shafts 5 and 6, which latter carry gears 7 and 8 that mesh with each other and cause the screws 3 and 4 to turn in opposite directions.

An open ended cylinder 9 is fitted with a piston 10 and communicates with the end of the casing 1 by means of a passage 11.

To the bottom end of the cylinder 9 is attached a nozzle 12 having an opening 13 of the same cross section as the cross section of the cake which is to be formed. The piston 10 is preferably driven from a crank 14 by means of a connecting rod 15, and the crank pin 16 is fitted in a slot 17 in the crank 14 so that it may be adjusted with respect to its distance from the center of the crank shaft 18 and maintained in its adjusted position.

By this arrangement the length of the stroke of the piston 10 may be varied at will.

The crank shaft 18 is supported in suitable bearings 19—20.

A conveyor belt 21 is provided and is supported by means of pulleys 22—23, and a conveyor belt 24 supported by the pulleys 25—26 is arranged adjacent the belt 21. Arranged above the belt 21 are two members 27—28 substantially U shaped in cross section and opposed to each other, and arranged above the belt 24 are also members 29—20 also substantially U shaped in cross section and opposed to each other.

The function of the members 27—28 is to fold over two sides of the wrapper after the cake has been deposited on the conveyor 21, while the members 29—30 fold over the other two sides as the article is being advanced by the conveyor 24.

A shaft 31 driven by any suitable means and supported by bearings 32—33 carries a friction clutch 34, the free running element of which carries a sprocket 35 and drives the shaft 6 by means of a sprocket chain 36 and a sprocket 37.

The friction clutch may be connected by means of a lever 38 pivoted as at 39 and to the lever 38 is attached a spring 40, the action of which latter is to move the lever in a direction to engage the clutch 34.

A cross shaft 41 is supported by suitable journals 42—43 and may be driven from the shaft 31 by means of a worm and gear 44—45.

A rocker arm 46 may be connected with the lever 38 by means of a link 50. The shaft 41 is further provided with a sprocket 51 which drives the shaft 18 by means of the sprocket and chains 52—53, and the shaft 54 supporting the pulley 22 is driven from the shaft 31 by means of beveled gears 55 and 56. The pulley 25 on the cross conveyor 24 may be driven by any suitable means.

It is thought that the operation of the machine will be clearly understood from the foregoing, but briefly stated it is as follows.

Plastic material is charged into the hopper 2 from which it falls into the casing 1 and is engaged by means of the screws 3 and 4 which operate to force it into the cylinder 9 through the passage 11. The contour of the cam 49 is such as to cause intermittent engagement of the clutch 34 and also to give only enough movement to the screws 3 and 4 to force a predetermined amount of material into the cylinder 9. The cam 49 is so set with relation to the shaft 41 that material will be forced into the cylinder 9 only at the times when the piston 10 is at the upper part of its stroke.

A cloth 57 in which the material is wrapped is placed on the conveyor belt 21.

The crank 14 is set with relation to the other parts of the machine so that the plastic material begins to exude from the nozzle 13 at the time that the cloth 57 has moved to the proper position to receive the cake.

The stroke of the piston is adjusted so that a cake of the requisite length is formed and discharged through the nozzle 13 and on to the cloth as the latter moves along under the nozzle opening 13. As the material is discharged from the nozzle and deposited upon the cloth 57, it will be severed or broken from any material which may be in the nozzle by the pulling action upon the extruded material by the traveling conveyor 21 carrying the material forwardly and away from the nozzle. The cloth with the cake deposited thereon is carried along by the conveyor belt 21 until the member 27 engages one side of the cloth and folds it over as at 58. Continued movement of the conveyor in the same direction causes the other side of the cloth to be folded over by engaging the member 29 as at 59.

Further movement of the conveyor 21 causes the cake with the cloth now partially folded over from both sides to be transferred to the conveyor 24. The movement of the conveyor 24 carries the cloth and cake against the member 29 where one side is folded over as at 60 and a further movement causes the cake and cloth to be carried against the member 30 when the remaining end is folded over as at 61.

The cam 49 provides a means whereby the exact weight of the cake or the material to be measured out for the cake is controlled and by varying the cam by substituting another cam therefor, it will be manifest that different sized cakes may be formed and delivered.

The length of the cake with respect to the material upon which it is deposited may be determined by varying the stroke of the piston 10 through the medium of the adjustment of the pin 16 in the slot 17 of the crank 14.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A machine for shaping and wrapping plastic materials embodying a hopper for the material, said hopper having a discharge outlet, a cylinder for receiving the material from the hopper, a nozzle leading from the cylinder, a piston reciprocable in the cylinder to force the material through the outlet thereof, a conveyor operating adjacent said nozzle for receiving the material therefrom and which is deposited upon wrapping sheets upon the conveyor, the said conveyor operating to sever from the supply in the hopper the material deposited thereupon, and means for wrapping the material as it is advanced by the conveyor.

2. A machine for shaping and wrapping plastic materials embodying a hopper for the material, said hopper having a discharge outlet, a cylinder for receiving the material from the hopper, a nozzle leading from the cylinder, a piston reciprocable in the cylinder to force the material through the outlet thereof, a conveyor operating adjacent said nozzle for receiving the material therefrom upon wrapping sheets carried by the conveyor, the said conveyor operating to sever from the supply in the hopper the material deposited thereupon, and wrapping elements substantially U shape in cross section arranged along the path of movement of the material by the conveyor for wrapping the sheet about the material as it is advanced.

3. A machine for shaping and wrapping plastic materials embodying a hopper for the material, said hopper having a discharge outlet, screw members rotating in opposite directions for forcing the material from the hopper, a cylinder for receiving the material from the hopper, a nozzle leading from the cylinder, a piston reciprocable in the cylinder to force the material through the outlet thereof, a conveyor operating adjacent said nozzle for receiving the material therefrom upon wrapping sheets carried by the conveyor, the said conveyor operating to sever from the supply in the hopper the material deposited thereupon, and means for wrapping the sheets about the material as it is advanced by the conveyor.

4. A machine for shaping and wrapping plastic material, said machine embodying a cylinder, a piston reciprocable therein, means for forcing the material into the cylinder, a discharge nozzle leading from the cylinder, a conveyor operating past the nozzle to receive the material therefrom, and to advance the material with respect to the nozzle and thereby sever the deposited material from the supply in the hopper and from the nozzle, and means for folding a wrapper about the material as it is being advanced by the conveyor.

5. A machine for shaping and wrapping plastic material, said machine embodying a cylinder, a piston reciprocable therein, means for forcing the material into the cylinder, a discharge nozzle leading from the cylinder, a conveyor operating past the nozzle to receive the material therefrom, and to advance the material with respect to the nozzle and thereby sever the deposited material from the supply in the hopper and from the nozzle, means for folding a wrapper about the material as it is being advanced by the conveyor, and means whereby the stroke of the piston may be varied to vary the quantity of material discharged through the nozzle by the movement of the piston.

6. A machine for shaping and wrapping plastic material, said machine embodying a cylinder, a piston reciprocable therein, a hopper, means for forcing the material from the hopper into the cylinder, a nozzle through which the material is forced from the cylinder, a conveyor operating to convey a wrapper adjacent the nozzle to receive the material therefrom, and for advancing the material with respect to the nozzle and thereby sever the deposited material from the supply and nozzle, a second conveyor operating adjacent the first said conveyor to receive the material and wrapper from the latter, and means individual to the conveyors for folding opposite portions of the wrapper over the material as the wrapper and material are advanced.

7. A machine for shaping and wrapping plastic material, said machine embodying a hopper for the material, a cylinder, means operating automatically to intermittently deliver predetermined quantities of the material from the hopper into the cylinder, a piston reciprocable in the cylinder, a discharge nozzle for shaping the material as it is delivered from the nozzle, a conveyor for conveying a wrapper to and upon which wrapper the material is delivered from the nozzle, and for advancing the material with respect to the nozzle and thereby sever the same from the supply in the hopper and from the nozzle, and means arranged along the path of travel of the material for folding the wrapper over the material.

8. A machine for shaping and wrapping plastic material, said machine embodying a hopper for the material, a cylinder, means operating automatically to intermittently deliver predetermined quantities of the material from the hopper into the cylinder, a piston reciprocable in the cylinder, a discharge nozzle for shaping the material as it is delivered from the nozzle, a conveyor for conveying a wrapper to and upon which wrapper the material is delivered from the nozzle, the advancement of the conveyor with the deposited material thereupon operating to sever the latter from the supply in the hopper and the nozzle, and opposed substantially U shaped members arranged along the line of travel of the material and wrapper upon the conveyor for folding the wrapper over the material.

9. A machine for shaping and wrapping plastic material, embodying a hopper, a cylinder communicating therewith, intermittently operating means for forcing a predetermined amount of the material from the hopper into the cylinder, a piston in the cylinder, a nozzle discharging from the cylinder, a conveyor for conveying a wrapper adjacent the nozzle to receive the material from the nozzle, thereon, and by the advancement thereof sever the material from the supply and nozzle and means for folding the wrapper about the material.

10. A machine for shaping and wrapping plastic material, embodying a hopper, a cylinder communicating therewith, intermittently operating means for forcing a predetermined amount of the material from the hopper into the cylinder, a piston in the cylinder, a nozzle discharging from the cylinder, a conveyor for conveying a wrapper adjacent the nozzle and by the advancement thereof sever the deposited material from the supply in the hopper and nozzle to receive the material from the nozzle, thereon, and opposed substantially U shaped and stationary folder elements arranged along the line of travel of the material and wrapper for folding the wrapper over the material.

11. A machine for shaping and wrapping plastic material, embodying a hopper, a cylinder communicating therewith, intermittently operating means for forcing a predetermined amount of the material from the hopper into the cylinder, a piston in the cylinder, means whereby the stroke of the piston in the cylinder may be varied, a nozzle discharging from the cylinder, a conveyor for conveying a wrapper adjacent the nozzle to receive the material from the nozzle thereon, the advancement of the conveyor operating to sever the deposited quantity from the supply in the hopper and from the nozzle, and means for folding the wrapper about the material.

12. A machine for shaping and wrapping plastic material embodying a cylinder for a supply of the material, a piston in the cylinder, a nozzle discharging from the cylinder, means for reciprocating the piston to force a predetermined quantity of material through the nozzle, a conveyor movable past the nozzle to receive the material therefrom, and means for actuating the conveyor, the advancing movement of the conveyor with the material deposited thereupon operating to cause the material to be severed from the supply and from the nozzle.

In testimony whereof I have signed my name to this specification, on this 20th day of August, A. D. 1929.

NEWELL BEATTY.